United States Patent
Xu et al.

(10) Patent No.: US 10,339,100 B2
(45) Date of Patent: Jul. 2, 2019

(54) FILE MANAGEMENT METHOD AND FILE SYSTEM

(71) Applicant: Huawei Technologies Co., Ltd., Shenzhen (CN)

(72) Inventors: Jun Xu, Hangzhou (CN); Guanyu Zhu, Shenzhen (CN); Caizhu Luo, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 15/331,205

(22) Filed: Oct. 21, 2016

(65) Prior Publication Data
US 2017/0039203 A1    Feb. 9, 2017

Related U.S. Application Data

(63) Continuation of application No. PCT/CN2014/075939, filed on Apr. 22, 2014.

(51) Int. Cl.
*G06F 16/10* (2019.01)
*G06F 16/11* (2019.01)
(Continued)

(52) U.S. Cl.
CPC ............ *G06F 16/122* (2019.01); *G06F 3/061* (2013.01); *G06F 3/0649* (2013.01);
(Continued)

(58) Field of Classification Search
CPC ......... G06F 17/30082; G06F 17/30218; G06F 17/30221; G06F 3/061; G06F 3/0649;
(Continued)

(56) References Cited

U.S. PATENT DOCUMENTS

| 776,967 A | 12/1904 | Tassel et al. |
| 5,960,181 A * | 9/1999 | Sanadidi ............. G06F 11/3457 703/17 |

(Continued)

FOREIGN PATENT DOCUMENTS

| CN | 1613064 A | 5/2005 |
| CN | 101676857 A | 3/2010 |

(Continued)

OTHER PUBLICATIONS

Foreign Communication From a Counterpart Application, Korean Application No. 9-5-2018-051714182, Korean Notice of Allowance dated Jul. 31, 2018, 3 pages.

(Continued)

*Primary Examiner* — Kris E Mackes
*Assistant Examiner* — Tiffany Thuy Bui
(74) *Attorney, Agent, or Firm* — Conley Rose, P.C.

(57) ABSTRACT

A file management method and a file system are applied to the field of data processing technologies. The file system monitors input/output (IO) access information for operating a file, then determines an IO access mode of the file, determines a corresponding file management policy according to the IO access mode, and finally, when the obtained file management policy is inconsistent with a current management manner of the file, adjusts, according to the determined file management policy, the current management manner of the file, for example, a storage medium and a file management granularity, so as to dynamically adjust the storage medium and the file management granularity of the file according to the IO access mode of the file.

13 Claims, 5 Drawing Sheets

(51) Int. Cl.
*G06F 16/18* (2019.01)
*G06F 12/00* (2006.01)
*G06F 3/06* (2006.01)
*G06F 16/185* (2019.01)

(52) U.S. Cl.
CPC .......... *G06F 3/0659* (2013.01); *G06F 3/0685* (2013.01); *G06F 3/0688* (2013.01); *G06F 12/00* (2013.01); *G06F 16/185* (2019.01); *G06F 16/1847* (2019.01); *G06F 3/0608* (2013.01)

(58) Field of Classification Search
CPC .... G06F 3/0659; G06F 3/0685; G06F 3/0688; G06F 3/0608; G06F 12/00
See application file for complete search history.

(56) References Cited

U.S. PATENT DOCUMENTS

| | | | |
|---|---|---|---|
| 6,467,021 | B1 | 10/2002 | Sinclair |
| 7,363,440 | B1* | 4/2008 | Neuman ................ G06F 13/16 710/29 |
| 7,599,972 | B2 | 10/2009 | Dodge et al. |
| 8,566,549 | B1 | 10/2013 | Burke et al. |
| 8,732,800 | B1* | 5/2014 | Askew .................... G06Q 10/10 713/182 |
| 9,043,530 | B1* | 5/2015 | Sundaram ............... G06F 3/068 711/100 |
| 2003/0126354 | A1* | 7/2003 | Kahn .................. G06F 12/0215 711/105 |
| 2006/0080371 | A1* | 4/2006 | Wong .................. H04L 67/1097 |
| 2006/0259949 | A1* | 11/2006 | Schaefer ........... G06F 17/30082 726/1 |
| 2007/0067559 | A1 | 3/2007 | Fujibayashi et al. |
| 2008/0028164 | A1 | 1/2008 | Ikemoto et al. |
| 2009/0300712 | A1* | 12/2009 | Kaufmann .............. G06F 21/10 726/1 |
| 2010/0023566 | A1 | 1/2010 | Minamino et al. |
| 2010/0306283 | A1* | 12/2010 | Johnson ............ G06F 17/30085 707/803 |
| 2011/0035548 | A1 | 2/2011 | Kimmel et al. |
| 2011/0040850 | A1 | 2/2011 | Moromisato et al. |
| 2012/0047418 | A1* | 2/2012 | Nakagawa ............. H04N 1/405 714/766 |
| 2012/0290779 | A1 | 11/2012 | Eleftheriou et al. |

FOREIGN PATENT DOCUMENTS

| | | |
|---|---|---|
| CN | 102523285 A | 6/2012 |
| CN | 102714047 A | 10/2012 |
| CN | 102844734 A | 12/2012 |
| EP | 2735978 A1 | 5/2014 |
| JP | 2008515120 A | 5/2008 |
| JP | 2010026919 A | 2/2010 |
| KR | 20100016057 A | 2/2010 |
| WO | 2009102425 A1 | 8/2009 |
| WO | 2013071882 A1 | 5/2013 |

OTHER PUBLICATIONS

Foreign Communication From a Counterpart Application, European Application No. 14890404.8, Extended European Search Report dated Mar. 21, 2017, 10 pages.
Foreign Communication From a Counterpart Application, PCT Application No. PCT/CN2014/075939, English Translation of International Search Report dated Jan. 28, 2015, 2 pages.
Foreign Communication From a Counterpart Application, PCT Application No. PCT/CN2014/075939, English Translation of Written Opinion dated Jan. 28, 2015, 5 pages.
Machine Translation and Abstract of Chinese Publication No. CN102523285, Jun. 27, 2012, 5 pages.
Foreign Communication From a Counterpart Application, Chinese Application No. 201480001249.2, Chinese Office Action dated Jul. 5, 2017, 9 pages.
Foreign Communication From a Counterpart Application, Japanese Application No. 2016-563933, Japanese Office Action dated Dec. 12, 2017, 4 pages.
Foreign Communication From a Counterpart Application, Japanese Application No. 2016-563933, English Translation of Japanese Office Action dated Dec. 12, 2017, 4 pages.
Foreign Communication From a Counterpart Application, European Application No. 14890404.8, European Office Action dated Jan. 2, 2019, 7 pages.

* cited by examiner

FILE MANAGEMENT METHOD AND FILE SYSTEM

CROSS-REFERENCE TO RELATED APPLICATION

This application is a continuation of International Application No. PCT/CN2014/075939, filed on Apr. 22, 2014, the disclosure of which is hereby incorporated by reference in its entirety.

TECHNICAL FIELD

The present disclosure relates to the field of data processing technologies, and in particular, to a file management method and a file system.

BACKGROUND

With the application of an NAND flash and the emergence of a new storage medium, such as a Phase change memory (PCM), different mediums have different read and write characteristics. This requires a file system to use management methods of different granularities to manage files stored in storage mediums, so as to improve performance. For example, if a coarse granularity is used for management, a storage overhead of metadata and a time delay of searching for a metadata index can be reduced; if a fine granularity is used for management, valid access to data can be ensured, bandwidth is not wasted, and data migration is reduced.

In the prior art, a file system identifies a file type according to a file name or information embedded in a file, and allocates a storage medium of a different granularity to the file. After the file type is determined, a management mode of the file is also determined, which is relatively fixed.

SUMMARY

Embodiments of the present disclosure provide a file management method and a file system, which implements dynamic adjustment of a current management manner of a file according to an input/output (IO) access mode of the file.

A first aspect of the embodiments of the present disclosure provides a file management method, including acquiring IO access information for operating a file; determining an IO access mode corresponding to the IO access information; matching the determined IO access mode with a preset mode matching library to obtain a file management policy corresponding to the determined IO access mode, where the file management policy includes at least one piece of the following information: a file management granularity and a file storage medium type, where the mode matching library includes a correspondence between the IO access mode and the file management policy; and adjusting a current management manner of the file when the current management manner of the file is inconsistent with the file management policy corresponding to the determined IO access mode, so that the adjusted current management manner is consistent with the file management policy corresponding to the determined IO access mode.

In a first possible implementation manner of the first aspect of the embodiments of the present disclosure, the determining an IO access mode corresponding to the IO access information includes, if a read operation proportion of the file in the IO access information is greater than a preset value, determining that the IO access mode is a read operation mode; if a write operation proportion of the file in the IO access information is greater than a preset value, determining that the IO access mode is a write operation mode; or if a difference between a write operation proportion and a read operation proportion that are of the file in the IO access information is less than a preset value, determining that the IO access mode is a read/write hybrid operation mode.

With reference to the first aspect or the first possible implementation manner of the first aspect of the embodiments of the present disclosure, in a second possible implementation manner of the first aspect of the embodiments of the present disclosure, the adjusting a current management manner of the file when the current management manner of the file is inconsistent with the file management policy corresponding to the determined IO access mode includes, if the file management granularity included in the obtained file management policy is inconsistent with a file management granularity in a current file management manner of the file, updating a management granularity of the file; and updating metadata of the file, so that the updated metadata includes information about the updated management granularity.

With reference to the first aspect or the first possible implementation manner of the first aspect of the embodiments of the present disclosure, in a third possible implementation manner of the first aspect of the embodiments of the present disclosure, the adjusting a current management manner of the file when the current management manner of the file is inconsistent with the file management policy corresponding to the determined IO access mode includes, if the file storage medium type included in the obtained file management policy is inconsistent with a storage medium in the current management manner of the file, applying, to a target storage medium, for a storage block used to store the file, where the target storage medium is a storage medium consistent with the file storage medium type included in the file management policy; migrating the file from a source storage medium to the applied storage block, where a storage medium in which the file is currently located is the source storage medium; and creating new metadata, so that the new metadata includes storage information of the migrated file.

With reference to the third possible implementation manner of the first aspect of the embodiments of the present disclosure, in a fourth possible implementation manner of the first aspect of the embodiments of the present disclosure, the method further includes, when the file requested to be operated is operated according to an IO access request for operating the file, if a first part of file in the file requested to be operated is not stored in the source storage medium, and a second part of file is stored in the source storage medium, according to the file storage medium type in the file management policy corresponding to the IO access mode, operating the first part of file in the target storage medium after the migration, and operating the second part of file in the source storage medium.

A second aspect of the embodiments of the present disclosure provides a file system, including an information acquiring unit configured to acquire input/output IO access information for operating a file; an access mode determining unit configured to determine an IO access mode corresponding to the IO access information acquired by the information acquiring unit; a management obtaining unit configured to match the IO access mode determined by the access mode determining unit with a preset mode matching library to obtain a file management policy corresponding to the determined IO access mode, where the file management policy includes at least one piece of the following information: a file management granularity and a file storage medium type, where the mode matching library includes a correspondence between the IO access mode and the file management policy; and an adjusting unit configured to adjust a current management manner of the file when the current management manner of the file is inconsistent with the file management policy that corresponds to the IO access mode and that is determined by the management obtaining unit, so that the adjusted current management manner is consistent with the file management policy corresponding to the determined IO access mode.

In a first possible implementation manner of the second aspect of the embodiments of the present disclosure, the access mode determining unit is configured to, if a read operation proportion of the file in the IO access information acquired by the information acquiring unit is greater than a preset value, determine that the IO access mode is a read operation mode; if a write operation proportion of the file in the IO access information acquired by the information acquiring unit is greater than a preset value, determine that the IO access mode is a write operation mode; or if a difference between a write operation proportion and a read operation proportion that are of the file in the IO access information acquired by the information acquiring unit is less than a preset value, determine that the IO access mode is a read/write hybrid operation mode.

With reference to the second aspect or the first possible implementation manner of the second aspect of the embodiments of the present disclosure, in a second possible implementation manner of the second aspect of the embodiments of the present disclosure, the adjusting unit includes an updating unit configured to, if the file management granularity included in the obtained file management policy is inconsistent with a file management granularity in the current management manner of the file, update a management granularity of the file; and update metadata of the file, so that the updated metadata includes information about the updated management granularity.

With reference to the second aspect or the first possible implementation manner of the second aspect of the embodiments of the present disclosure, in a third possible implementation manner of the second aspect of the embodiments of the present disclosure, the adjusting unit includes a migrating unit configured to, if the file storage medium type included in the obtained file management policy is inconsistent with a storage medium in the current management manner of the file, apply, to a target storage medium, for a storage block used to store the file, and migrate the file from a source storage medium to the applied storage block, where a storage medium in which the file is currently located is the source storage medium, and the target storage medium is a storage medium consistent with the file storage medium type included in the file management policy; and a creating unit configured to create new metadata, so that the new metadata includes storage information of the file migrated by the migrating unit.

With reference to the third possible implementation manner of the second aspect of the embodiments of the present disclosure, in a fourth possible implementation manner of the second aspect of the embodiments of the present disclosure, the system further includes a file operating unit configured to, when the file requested to be operated is operated according to an IO access request for operating the file, if a first part of file in the file requested to be operated is not stored in the source storage medium, and a second part of file is stored in the source storage medium, according to the file storage medium type in the file management policy corresponding to the IO access mode, operate the first part of file in the target storage medium after the migration, and operate the second part of file in the source storage medium.

A third aspect of the embodiments of the present disclosure provides a file system, including a processor and multiple memories that are separately connected to a bus, where the processor is configured to acquire IO access information for operating a file; determine an IO access mode corresponding to the acquired IO access information; match the determined IO access mode with a preset mode matching library to obtain a file management policy corresponding to the determined IO access mode, where the file management policy includes at least one piece of the following information: a file management granularity and a file storage medium type, where the mode matching library includes a correspondence between the IO access mode and the file management policy; and adjust a current management manner of the file when the current management manner of the file is inconsistent with the file management policy corresponding to the determined IO access mode, so that the adjusted current management manner is consistent with the file management policy corresponding to the determined IO access mode; and the file storage medium is the memory.

In a first possible implementation manner of the third aspect of the embodiments of the present disclosure, the processor is configured to, if a read operation proportion of the file in the acquired IO access information is greater than a preset value, determine that the IO access mode is a read operation mode; if a write operation proportion of the file in the acquired IO access information is greater than a preset value, determine that the IO access mode is a write operation mode; or if a difference between a write operation proportion and a read operation proportion that are of the file in the acquired IO access information is less than a preset value, determine that the IO access mode is a read/write hybrid operation mode.

With reference to the third aspect or the first possible implementation manner of the third aspect of the embodiments of the present disclosure, in a second possible implementation manner of the third aspect of the embodiments of the present disclosure, the processor is configured to, if the file management granularity included in the obtained file management policy is inconsistent with a file management granularity in the current management manner of the file stored in the memory, update a management granularity of the file in the memory; and update metadata of the file, so that the updated metadata includes information about the updated management granularity.

With reference to the third aspect or the first possible implementation manner of the third aspect of the embodiments of the present disclosure, in a third possible implementation manner of the third aspect of the embodiments of the present disclosure, the processor is configured to, if the file storage medium type included in the obtained file management policy is inconsistent with a storage medium in the current management manner of the file stored in the memory, apply, to a target storage medium in the multiple memories, for a storage block used to store the file, migrate the file from a source storage medium in the multiple memories to the applied storage block, and create new metadata, so that the new metadata includes storage information of the file migrated by the migrating unit; and a storage medium in which the file is currently located is the source storage medium, and the target storage medium is a storage medium consistent with the file storage medium type included in the file management policy.

With reference to the third possible implementation manner of the third aspect of the embodiments of the present disclosure, in a fourth possible implementation manner of the third aspect of the embodiments of the present disclosure, the processor is further configured to, when the file requested to be operated is operated according to an IO access request for operating the file, if a first part of file in the file requested to be operated is not stored in the source storage medium, and a second part of file is stored in the source storage medium, according to the file storage medium type in the file management policy corresponding to the IO access mode, operate the first part of file in the target storage medium after the migration, and operate the second part of file in the source storage medium.

It can be learned that in the embodiments of the present disclosure, a file system monitors IO access information for operating a file (for example, performing read and write operations), determines an IO access mode of the file, determines a corresponding file management policy according to the IO access mode, and finally, dynamically adjusts a current management manner of the file according to the file management policy. In this way, during file management, different file management policies may be correspondingly used according to different IO access modes of the file, that is, different file management granularities and/or different file storage mediums are used, so that performance of accessing the file may be optimal, and a characteristic of a storage medium is full played.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings.

DETAILED DESCRIPTION

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present disclosure described herein can, for example, be implemented in orders except the order illustrated or described herein. Moreover, the terms "include", "contain" and any other variants mean to cover non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
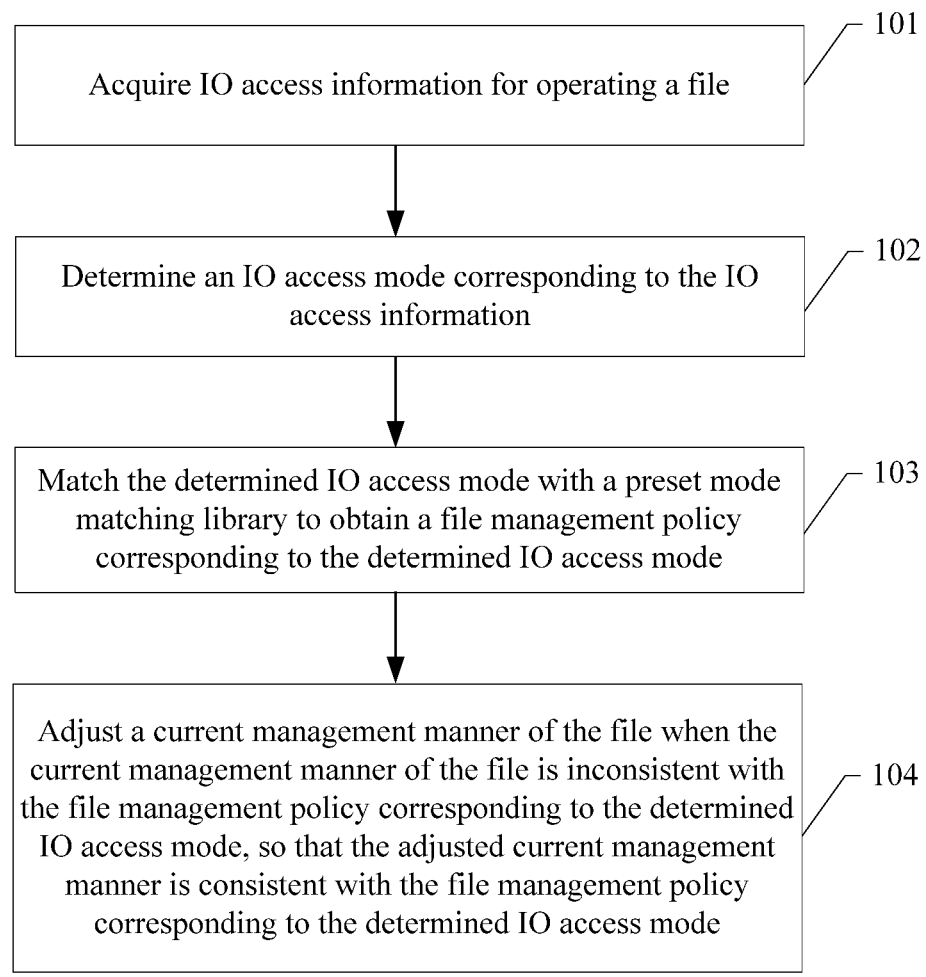
FIG. 1 is a flowchart of a file management method according to an embodiment of the present disclosure.

An embodiment of the present disclosure provides a file management method, which is mainly applied to a file system. The file system may be carried on any terminal device or network device, and may include multiple types of storage mediums that are configured to store various files. A flowchart of the method in this embodiment is shown in FIG. 1, including the following steps.

Step 101: Obtain IO access information for operating a file. Herein, because data of the file is stored in a storage medium in the file system, the IO access information herein refers to information about access to the file in the storage medium by the file system, and may include an access process identity (PID), a file name, a file offset, a file size of each IO access request, a file operation type (for example, read, write, or query) corresponding to IO access, and a timestamp (start and end time) of the IO access request.

Step 102: Determine an IO access mode corresponding to the IO access information acquired in step 101.

It can be understood that a procedure of operating the file, for example, performing a read/write operation on the file, may be triggered in a running process of an application program in the file system, and then a module executing the application program sends the IO access request to the file system. The IO access request may include information about a file requested to be operated (involving the read/write operation) and the like. In this way, the file system may operate a corresponding file.

After a file is first written into the storage medium of the file system, the file may be repeatedly operated. The file system may monitor IO access information of the file, and intercepts the IO access information for operating the file, for example, information such as a type and times of IO access, either IO access of a sequential/random read operation on the file or IO access of a sequential/random write operation on the file, a read/write proportion, and a granularity of the file during each access. A file offset of an operation may further be included. Then, the file system determines the IO access mode according to the acquired IO access information, where the IO access mode refers to a mode in which the file is operated using what granularity and in which manner, and may include a mode such as a mode in which a random read operation is performed using a granularity, a mode in which a sequential read operation is performed by using a granularity, a mode in which a random write operation is performed using a granularity, a mode in which a sequential write operation is performed using a granularity, a mode in which a sequential read/write hybrid operation is performed using a granularity, or a mode in which a random read/write hybrid operation is performed using a granularity.

If a read operation proportion of the file in the IO access information is greater than a preset value, it is considered that the IO access mode is a read operation mode; if a write operation proportion of the file in the IO access information is greater than a preset value, it is determined that the IO access mode is a write operation mode; or if a difference between a write operation proportion and a read operation proportion that are of the file in the IO access information is less than a preset value, it is determined that the IO access mode is a read/write hybrid operation mode. In addition, the IO access mode may further include a granularity for performing an operation.

Step 103: Match the IO access mode determined in step 102 with a preset mode matching library in the file system to obtain a file management policy corresponding to the determined IO access mode. The mode matching library of the file is preset in the file system, and may include a correspondence between the IO access mode and the file management policy. The file management policy includes a file management granularity and/or a file storage medium type.

The file management granularity refers to a minimum unit of file storage, for example, 4 kilobytes (kB) or 1 megabyte (MB). There are multiple types of file storage mediums, which may include a PCM, a Dynamic random access memory (DRAM), a hard disk drive (HDD), a NAND Flash, and the like. Because various types of storage mediums correspondingly have their respective read/write characteristics, different types of storage mediums correspond to different IO access modes, which is:

(1) the PCM is a non-volatile storage device, performs addressing according to a byte like the DRAM, and has an extremely high write speed; write durability of the PCM may be a sixth power of 10 to an eighth power of 10, and the PCM is suitable for a relatively small file management granularity, for example, 64 Byte-8 KB, and is suitable for a random read/write operation of a small granularity;

(2) for the NAND Flash, write is performed in a unit of a page, and erase is performed in a unit of a block (one block generally includes 64 or more pages); therefore, the NAND Flash is suitable for a file management granularity in a unit of a page or a block, for example, 4 KB, 8 KB, 16 KB, . . . , 512 KB, and is suitable for a random read operation of a relatively large size; in addition, for the NAND Flash, read is much faster than write; and (3) because seek time of the HDD is relatively long, a read/write delay is relatively large, and the HDD is suitable for a read/write operation of a relatively large granularity, for example, 1 MB, 2 MB, or 4 MB; in addition, the HDD is suitable for a sequential read/write operation.

It should be noted that access to an application file generally presents different access characteristics. For example, a video file is generally read and written in a sequential manner, and a granularity of each read/write operation is relatively large. For another example, a database file presents a characteristic of a random read/write operation of a small granularity. In this way, access to different files presents different access characteristics, and different storage mediums and file management granularities may be obtained by matching.

In this embodiment, a user may preset the correspondence between the IO access mode and the file management policy in the mode matching library of the file system. For example, a file management policy corresponding to an IO access mode that is a mode of a sequential read operation of a granularity from 1 MB to 4 MB is that the file management granularity is 1 MB, and the file storage medium type is the HDD or the NAND Flash. In this way, the file system may obtain a corresponding file management policy using the IO access mode and the mode matching library preset in the file system, as shown in Table 1.

TABLE 1

| IO Access Information | IO Access Mode | File Management Policy |
| --- | --- | --- |
| Read operation proportion >80%, 1 MB-4 MB | Sequential read operation of a granularity from 1 MB to 4 MB | File access granularity: 1 MB Storage medium type: HDD, NAND Flash |
| Write operation proportion >80%, 512 Byte-4 KB | Random write operation of a granularity from 512 Byte to 4 KB | File access granularity: 4 KB Storage medium type: PCM, NAND Flash |
| Read operation proportion, >80% 4 KB-64 KB | Random read operation of a granularity from 4 KB to 64 KB | File access granularity: 4 KB Storage medium type: NAND Flash, PCM |
| 50% of read, and 50% of write, 16 KB | Read/write hybrid operation of a granularity of 16 KB | File access granularity: 4 KB Storage medium type: PCM, NAND Flash |

Step 104: Adjust a current management manner of the file according to the file management policy obtained in step 103. When the current management manner of the file is inconsistent with the file management policy corresponding to the determined IO access mode, the current management manner of the file is adjusted, so that the adjusted current management manner is consistent with the file management policy corresponding to the determined IO access mode, for example, a storage medium of the file is changed and/or a management granularity of the file is changed. Further, because the file system further stores metadata of the file, the metadata includes information such as a file size and a file identifier, so as to facilitate file searching. After the current management manner of the file is adjusted, the metadata stored in the file system further needs to be updated.

It should be noted that in the foregoing file management process, a proper file management granularity facilitates a valid file prefetch operation, improves a speed of a file operation, and further facilitates valid metadata management. For example, for sequential file access, a file of 4 MB is written once; if a file management granularity of 2 MB (that is, a minimum unit of a storage block is 2 MB) is used, data positioning is needed only twice and the IO access request needs to be sent to the storage medium only twice, and metadata of only two storage blocks needs to be managed; if a file management granularity of 4 KB is used, data positioning is needed 1000 times and the IO access request needs to be sent to the storage medium 1000 times, and metadata of 1000 storage blocks needs to be managed.

It can be learned that in this embodiment of the present disclosure, a file system monitors IO access information for operating a file, determines an IO access mode, then determines a corresponding file management policy according to the IO access mode, and finally, dynamically adjusts a current management manner of the file according to the obtained file management policy when the obtained file management policy is inconsistent with the current management manner of the file. In this way, during file management, different file management policies may be correspondingly used according to different IO access modes of the file, that is, different file management granularities and/or different file storage mediums are used, so that performance of accessing the file may be optimal, and a characteristic of a storage medium is full played.

Figure 2:
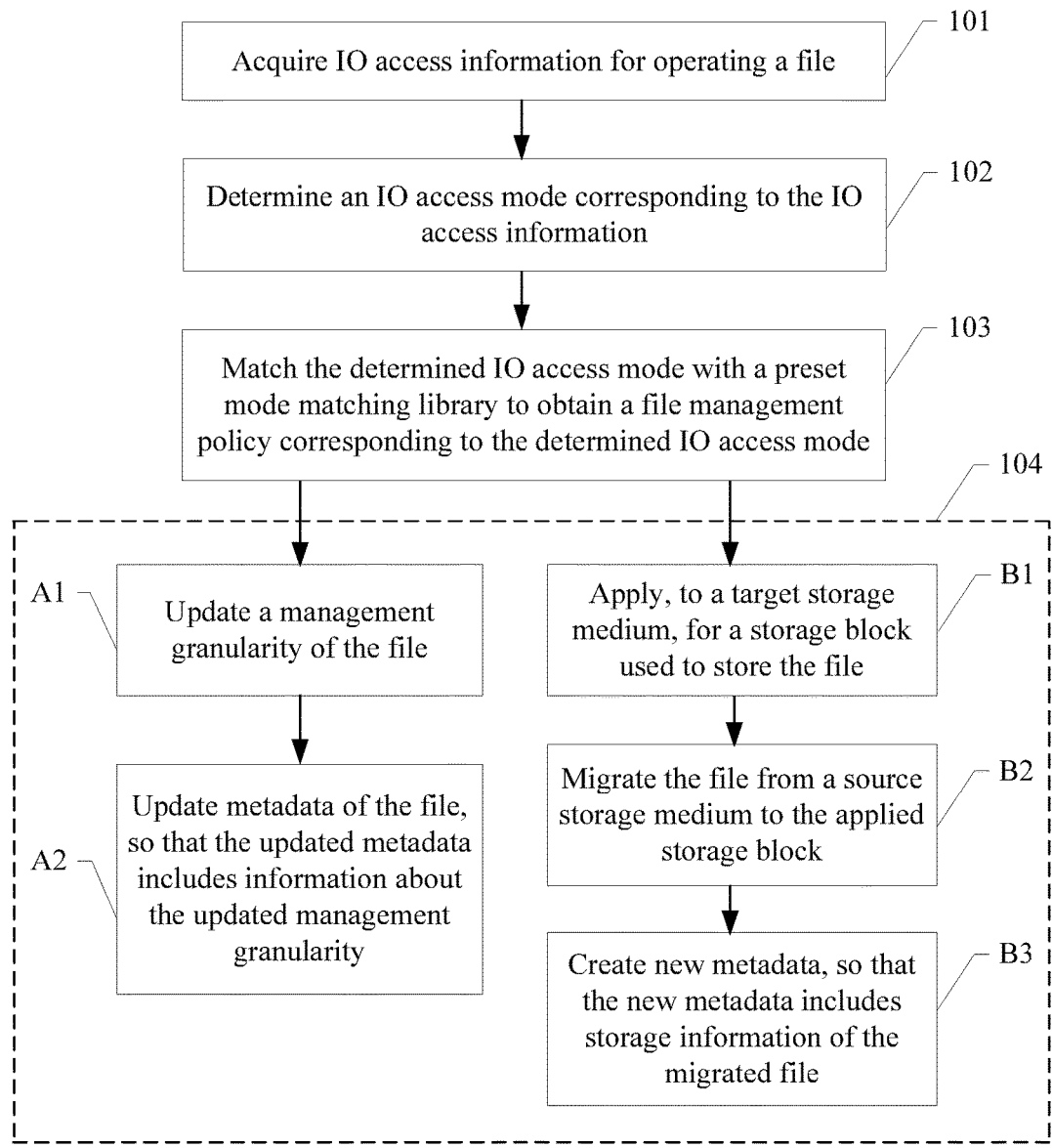
FIG. 2 is a flowchart of another file management method according to an embodiment of the present disclosure.

Referring to FIG. 2, in a specific embodiment, when a file system executes the foregoing step 104, there may be the following several methods according to the file management policy obtained in step 103:

(1) If a file management granularity included in the file management policy obtained in step 103 is inconsistent with a file management granularity in a current management manner of a file, when the file system executes step 104, A1: a management granularity of the file is updated to the file management granularity obtained in step 103; and A2: metadata of the file is updated, so that the updated metadata includes information about the updated management granularity.

(2) If a file storage medium type included in the file management policy obtained in step 103 is inconsistent with a storage medium in the current management manner of the file, when the file system executes the foregoing step 104, migration is performed on a file storage medium, which is:

B1: A storage block used to store the foregoing file is applied for to a target storage medium, where the target storage medium is a storage medium consistent with the file storage medium type included in the file management policy obtained in the foregoing step 103.

A granularity of the applied storage block herein may be determined by the file management granularity obtained in the foregoing step 103. If the obtained file management policy does not include the file management granularity, the granularity of the applied storage block may be a minimum storage unit of the file in the source storage medium, may be a proper granularity for the target storage medium, or the like. If the obtained file management policy includes the file management granularity, the granularity of the applied storage block is the file management granularity in the file management policy.

B2: The file is migrated from the source storage medium to the applied storage block, that is, the file is copied from the source storage medium and added to the applied storage block, and data of the file in the source storage medium may further be deleted. A storage medium in which the file is currently located is the source storage medium.

B3: New metadata is created, so that the new metadata includes storage information of the migrated file, for example, a file size and a minimum unit of file storage.

It should be noted that when the current management manner of the file is adjusted, migration of the file storage medium is involved. In this process, the file system still constantly operates the file using the storage medium, that is, the file system performs, according to an IO access request for operating the file, a corresponding operation (for example, a read/write operation) on the file requested to be operated. In this case, before performing the read/write operation on the file, the file system needs to first determine whether the file requested to be operated is already migrated to the target storage medium. It is checked whether the source storage medium stores the file requested to be operated. If one part (for example, a first part) of file in the file requested to be operated is not stored in the source storage medium, and another part (for example, a second part) of file in the file requested to be operated is stored in the source storage medium, according to the file storage medium type in the file management policy corresponding to an IO access mode, the file system operates a first file in the target storage medium after the migration and operates the second part of file in the source storage medium.

Figure 3:
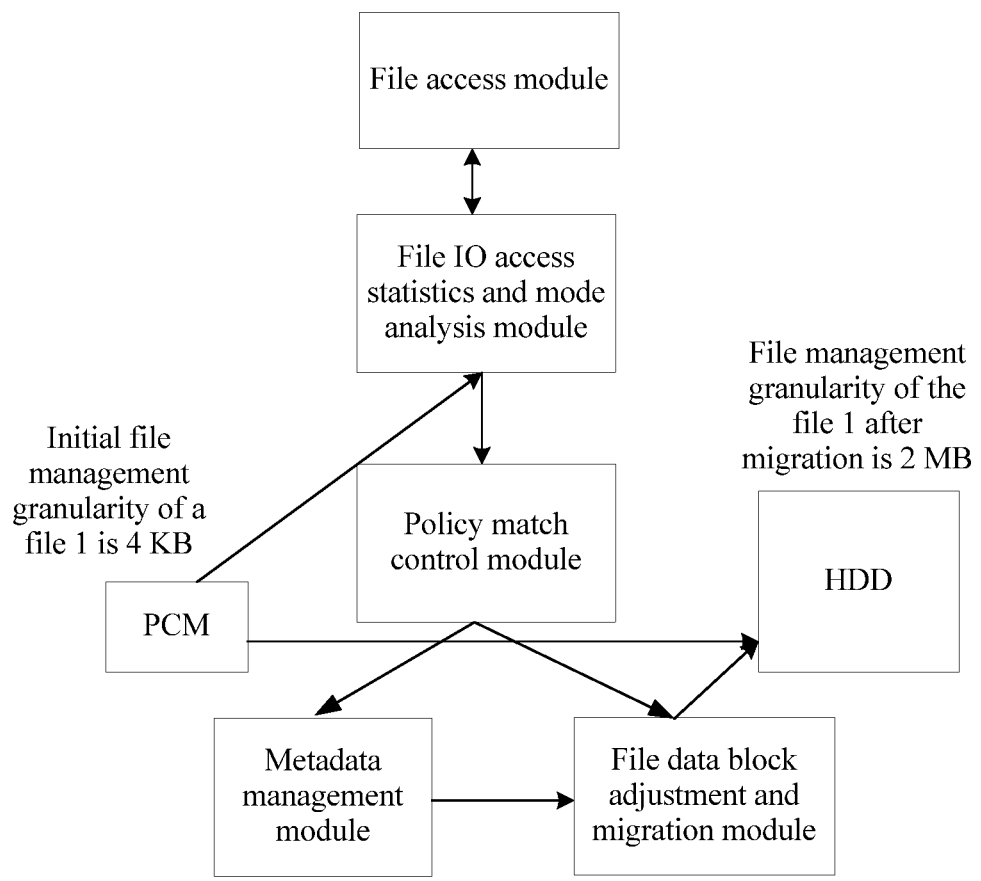
FIG. 3 is a schematic structural diagram of a file system according to an embodiment of the present disclosure.

The following describes a file management method in the present disclosure using a specific embodiment. The file management method in this embodiment is mainly applied to any file system, where the file system may include a structure shown in FIG. 3, including a file access module, a file IO access statistics and mode analysis module, a policy match control module, a metadata management module, and a file data block adjustment and migration module, and further including multiple types of storage mediums, for example, an HDD and a PCM, where various files are stored in various storage mediums; the file access module is configured to receive an IO access request for operating a file, and operate the file requested by the access request in a file storage medium; the file access module may receive the IO access request sent by the file system using a user interface, or may receive the IO access request sent by another module in the file system; the file IO access statistics and mode analysis module is configured to monitor access to the file in the storage medium by the file access module, collect IO access information of an operation performed by the file access module on the file stored in the storage medium, and analyze the IO access mode; the policy match control module is configured to match different file management policies according to different IO access modes, including a file management granularity and a file storage medium type; and the metadata management module is configured to update metadata of the file after a current management manner of the file is adjusted; the file data block adjustment and migration module is configured to adjust the file management granularity and migrate the file from one storage medium to another storage medium.

The file system in this embodiment supports management manners of different granularities, for example, 4 KB, 16 KB, 64 KB, 1 MB, and 2 MB. When the file is initially created, the file may be stored in one or more storage mediums according to a granularity, for example, 64 KB; then, the four modules shown in the foregoing FIG. 3 dynamically adjust the current management manner of the file. For example, when initially created, a file 1 is stored in the PCM using a file management granularity of 4 KB, and the file 1 is migrated to the HDD by means of dynamic adjustment and is stored using a file management granularity of 2 MB.

Figure 4:
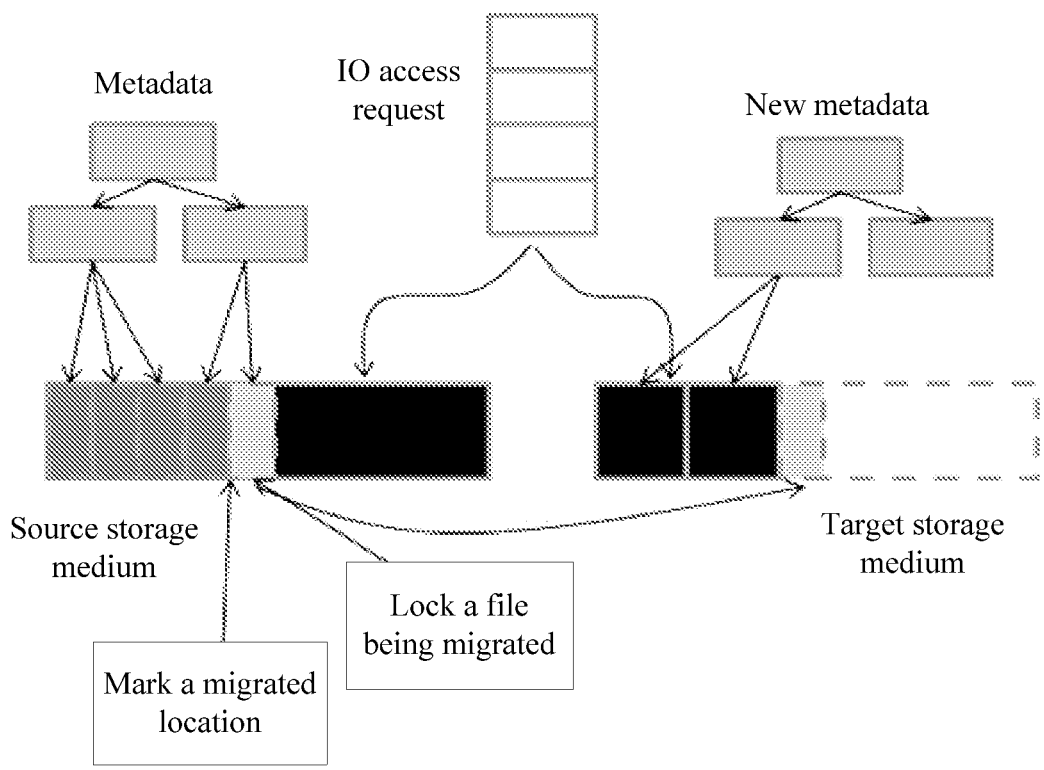
FIG. 4 is a schematic diagram of file migration according to an embodiment of the present disclosure.

Referring to FIG. 4, in a file migration process, a file system may migrate a file using a source file management granularity in a source storage medium. For example, a file management granularity of the source storage medium is 2 MB; then, the file system migrates the file in a unit of 2 MB, locks the file being migrated, and marks a migrated location in the source storage medium. In addition, after the file is migrated, the file system needs to create new metadata. In this process, when a file access module has an IO access request for operating the file, if a part of file in the requested file is already migrated to a target storage medium, that is, is not stored in the source storage medium, the part of file in the target storage medium after the migration is operated. If another part of file in the requested file is still not migrated to the target storage medium, the another part of file in the source storage medium is operated.

Figure 5:
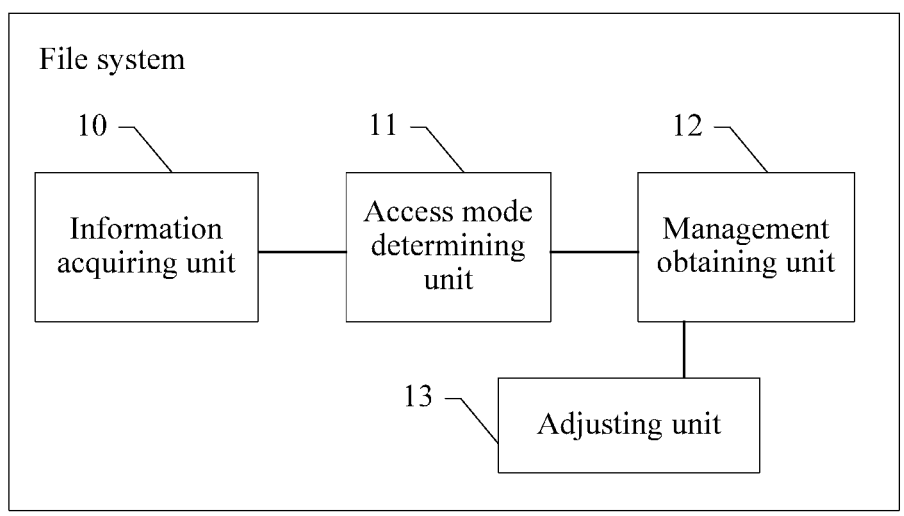
FIG. 5 is a schematic structural diagram of another file system according to an embodiment of the present disclosure.

An embodiment of the present disclosure further provides a file system, and a file is stored in the file system using multiple storage mediums. A schematic structural diagram of the file system is shown in FIG. 5, including an information acquiring unit 10 configured to acquire IO access information for operating a file, where the IO access information includes a specific situation for operating the file, for example, information such as access times, either IO access of a read operation on the file or IO access of a write operation on the file, a read/write proportion, and a read/write granularity of the file during each access; an access mode determining unit 11 configured to determine an IO access mode corresponding to the IO access information acquired by the information acquiring unit 10, where the access mode determining unit 11 is configured to, if a read operation proportion of the file in the IO access information acquired by the information acquiring unit 10 is greater than a preset value, determine that the IO access mode is a read operation mode; if a write operation proportion of the file in the IO access information acquired by the information acquiring unit 10 is greater than a preset value, determine that the IO access mode is a write operation mode; or if a difference between a write operation proportion and a read operation proportion that are of the file in the IO access information acquired by the information acquiring unit 10 is less than a preset value, determine that the IO access mode is a read/write hybrid operation mode; in addition, the IO access mode may further include a granularity of a read/write operation; a management obtaining unit 12 configured to match the IO access mode determined by the access mode determining unit 11 with a preset mode matching library to obtain a file management policy corresponding to the determined IO access mode, where the file management policy includes at least one piece of the following information a file management granularity and a file storage medium type, where the mode matching library includes a correspondence between the IO access mode and the file management policy; and an adjusting unit 13 configured to adjust a current management manner of the file when the current management manner of the file is inconsistent with the file management policy that corresponds to the IO access mode and that is determined by the management obtaining unit 12, so that the adjusted current management manner is consistent with the file management policy corresponding to the determined IO access mode, for example, a storage medium of the file is changed and/or a management granularity of the file is changed. Further, because the file system further stores metadata of the file, the metadata includes information such as a file size and a file identifier, so as to facilitate file searching. After the adjusting unit 13 adjusts the current management manner of the file, the metadata stored in the file system further needs to be updated.

It can be learned that in the file system in this embodiment of the present disclosure, an information acquiring unit 10 monitors IO access information for operating a file (involving read and write operations), and an access mode determining unit 11 determines an IO access mode, so that a management obtaining unit 12 determines a corresponding file management policy according to the IO access mode, and finally, an adjusting unit 13 dynamically adjusts a current management manner of the file according to the obtained file management policy. In this way, during file management, different file management policies may be correspondingly used according to different IO access modes of the file, that is, different file management granularities and/or different file storage mediums are used, so that performance of accessing the file may be optimal, and a characteristic of a storage medium is full played.

Figure 6:
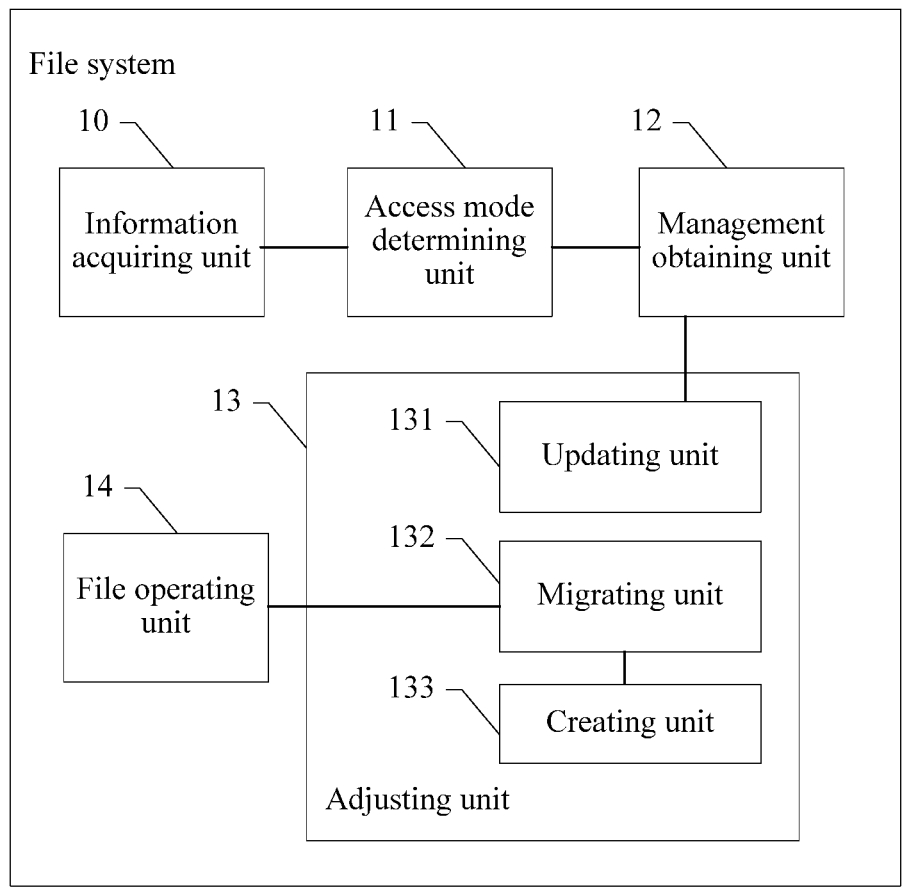
FIG. 6 is a schematic structural diagram of another file system according to an embodiment of the present disclosure.

Referring to FIG. 6, in a specific embodiment, in addition to the structure shown in FIG. 5, the file system may further include a file operating unit 14, and the adjusting unit 13 thereof may be implemented using an updating unit 131, a migrating unit 132, and a creating unit 133; the updating unit 131 is configured to, if the file management granularity included in the file management policy obtained by the management obtaining unit 12 is inconsistent with a file management granularity in the current management manner of the file, update a management granularity of the file to the file management granularity obtained by the management obtaining unit 12, and update metadata of the file, so that the updated metadata includes information about the updated management granularity.

The migrating unit 132 is configured to, if the file storage medium type included in the file management policy obtained by the management obtaining unit 12 is inconsistent with a storage medium in the current management manner of the file, apply, to a target storage medium, for a storage block used to store the file, and migrate the file from a source storage medium to the applied storage block, where a storage medium in which the file is currently located is the source storage medium, and the target storage medium is a storage medium consistent with the file storage medium type included in the file management policy; and the creating unit 133 is configured to create new metadata, so that the new metadata includes storage information of the file migrated by the migrating unit 132, and includes information about the target storage medium in which the migrated file is located and information such as the management granularity of the file in the target management medium. The target storage medium is a storage medium consistent with the file storage medium type included in the file management policy obtained by the management obtaining unit 12, and the granularity of the applied storage block may be determined by the file management granularity obtained by the management obtaining unit 12. If the obtained file management policy does not include the file management granularity, the granularity of the applied storage block may be a minimum storage unit of the file in the source storage medium, may be a proper granularity for the target storage medium, or the like.

The file operating unit 14 is configured to, when the file requested to be operated is operated according to an IO access request for operating the file, if a first part of file in the file requested to be operated is not stored in the source storage medium, and a second part of file is stored in the source storage medium, according to the file storage medium type in the file management policy corresponding to the IO access mode determined by the management obtaining unit 12, operate the first part of file in the target storage medium after the migration, and operate the second part of file in the source storage medium.

In the file system in this embodiment, when an adjusting unit 13 adjusts a current management manner of a file, a current storage granularity of the file may be updated only using an updating unit 131, or the file is migrated from one storage medium (that is, a source storage medium) to another storage medium (that is, a target storage medium) using a migrating unit 132 and a creating unit 133. In this case, when operating the file using an interface of a storage medium, a file operating unit 14 needs to first determine whether the file is already completely migrated to the target storage medium, and then perform corresponding processing.

Figure 7:
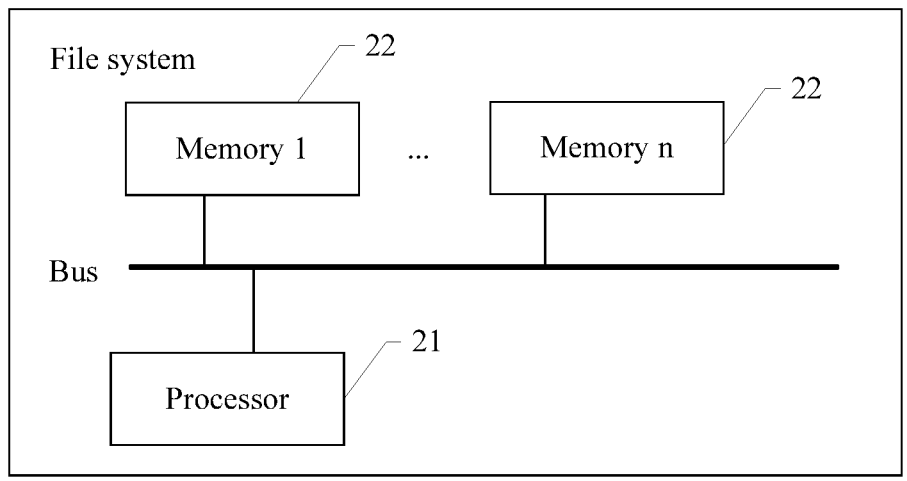
FIG. 7 is a schematic structural diagram of another file system according to an embodiment of the present disclosure.

An embodiment of the present disclosure further provides another file system, which may mainly manage a file stored in the file system. A schematic structural diagram of the file system is shown in FIG. 7, and the file system includes a processor 21 and multiple types of memories 22 that are separately connected to a bus, for example, memories such as an HDD and a PCM, and may further include an input apparatus and an output apparatus that are connected to the bus; the memories 22 are configured to store a file inputted from the input apparatus, and may further store information such as a file necessary for the processor 21 to process data. The memories 22 in this embodiment are the foregoing file storage medium. The input apparatus and the output apparatus are ports through which the file system communicates with another device, and may further include a device externally connected to the file system, for example, a display, a keyboard, a mouse, and a printer.

The processor 21 is configured to acquire IO access information for operating a file; determine an IO access mode corresponding to the acquired IO access information; match the determined IO access mode with a preset mode matching library to obtain a file management policy corresponding to the determined IO access mode, where the file management policy includes at least one piece of the following information a file management granularity and a file storage medium type, where the mode matching library includes a correspondence between the IO access mode and the file management policy; and adjust a current management manner of the file when the current management manner of the file is inconsistent with the file management policy corresponding to the determined IO access mode, so that the adjusted current management manner is consistent with the file management policy corresponding to the determined IO access mode. When determining the IO access mode, the processor 21 is configured to, if a read operation proportion of the file in the acquired IO access information is greater than a preset value, determine that the IO access mode is a read operation mode; if a write operation proportion of the file in the acquired IO access information is greater than a preset value, determine that the IO access mode is a write operation mode; or if a difference between a write operation proportion and a read operation proportion that are of the file in the acquired IO access information is less than a preset value, determine that the IO access mode is a read/write hybrid operation mode; in addition, the IO access mode may further include a granularity of a read/write operation. Further, because the storage medium in the file system further stores metadata of the file, the metadata includes information such as a file size, a file identifier, and an mode number, so as to facilitate file searching. After the processor 21 adjusts the current management manner of the file, the metadata stored in the file system further needs to be updated.

In this way, during file management, different file management policies may be correspondingly used according to different IO access modes, that is, different file management granularities and/or different file storage mediums are used, so that performance of accessing the file may be optimal, and a characteristic of a storage medium is full played.

In some specific embodiments, the processor 21 is configured to, if the file management granularity included in the obtained file management policy is inconsistent with a file management granularity in the current management manner of the file stored in the memory, update a management granularity of the file in the memory; and update metadata of the file, so that the updated metadata includes information about the updated management granularity.

In another aspect, the processor 21 is configured to, if the file storage medium type included in the obtained file management policy is inconsistent with a storage medium in the current management manner of the file stored in the memory, apply, to a target storage medium in the multiple memories, for a storage block used to store the file, migrate the file from a source storage medium in the multiple memories to the applied storage block, and create new metadata, so that the new metadata includes storage information of the file migrated by the migrating unit. A storage medium in which the file is currently located is the source storage medium, and the target storage medium is a storage medium consistent with the file storage medium type included in the file management policy.

In this case, when operating the file using an interface of a storage medium, the processor 21 needs to first determine whether the file is already completely migrated to the target storage medium, and then perform corresponding processing. The processor 21 is further configured to, when the file requested to be operated is operated according to an IO access request for operating the file, if a first part of file in the file requested to be operated is not stored in the source storage medium, and a second part of file is stored in the source storage medium, according to the file storage medium type in the file management policy corresponding to the IO access mode, operate the first part of file in the target storage medium after the migration, and operate the second part of file in the source storage medium.

Persons of ordinary skill in the art may understand that all or some of the steps of the methods in the embodiments may be implemented by a program instructing relevant hardware. The program may be stored in a computer-readable storage medium. The storage medium may include a read-only memory (ROM), a random-access memory (RAM), a magnetic disk, or an optical disc.

The foregoing gives detailed description on the file management method and the file system that are provided in embodiments of the present disclosure. In this specification, specific examples are used to describe the principle and implementation manners of the present disclosure, and the description of the embodiments is only intended to help understand the method and core idea of the present disclosure. Meanwhile, persons of ordinary skill in the art may, based on the idea of the present disclosure, make modifications with respect to the specific implementation manners and the application scope. Therefore, the content of this specification shall not be construed as a limitation to the present disclosure.

What is claimed is:

1. A file management method, comprising:
    acquiring input/output (IO) access information for a file in a source storage medium when an operation is repeatedly performed on the file, wherein the source storage medium comprises a storage medium type, wherein the operation uses a current management manner of the file comprising using a first file management granularity for the storage medium type;
    determining an IO access mode corresponding to the IO access information when the operation is repeatedly performed;
    matching the IO access mode with a preset access mode in a mode matching library to obtain a file management policy-associated with the IO access mode, wherein the file management policy comprises one of a second file management granularity, a file storage medium type, or the second file management granularity and the file storage medium type, and wherein the mode matching library comprises a correspondence between the IO access mode and the file management policy; and
    adjusting the current management manner to a new management manner when the current management manner is inconsistent with the file management policy comprising:
        applying, to a target storage medium, for a storage block used to store the file, wherein the target storage medium is a storage medium consistent with the file storage medium type comprised in the file management policy;

migrating the file from the source storage medium to the storage block, wherein the file is migrated and is operated according to another IO access request for operating the file, wherein a first part of the file is not stored in the source storage medium and a second part of the file is stored in the source storage medium, and wherein the first part of the file in the target storage medium is operated after the file is migrated and the second part of the file is operated in the source storage medium according to the file storage medium type in the file management policy corresponding to the IO access mode; and creating new metadata such that the new metadata comprises storage information of the migrated file, wherein the new management manner uses the second file management granularity and the file storage medium type corresponding to the IO access mode.

2. The file management method of claim 1, wherein determining the IO access mode corresponding to the IO access information comprises determining the IO access mode is a read operation mode when a read operation proportion of the file in the IO access information is greater than a preset value.

3. The file management method of claim 1, wherein determining the IO access mode corresponding to the IO access information comprises determining the IO access mode is a write operation mode when a write operation proportion of the file in the IO access information is greater than a preset value.

4. The file management method of claim 1, wherein determining the IO access mode corresponding to the IO access information comprises determining the IO access mode is a read/write hybrid operation mode when a difference between a write operation proportion and a read operation proportion of the file and in the IO access information is less than a preset value.

5. The file management method of claim 1, wherein adjusting the current management manner of the file when the current management manner of the file is inconsistent with the file management policy corresponding to the IO access mode comprises:

updating a management granularity of the file with the second file management granularity comprised in the file management policy when the first file management granularity is inconsistent with the second file management granularity; and updating metadata of the file to comprise information about the second file management granularity of the file.

6. A computer program product, comprising a non-transitory computer-readable medium storing computer executable instructions that when executed on a processor cause the processor to:

acquire input/output (IO) access information for a file in a source storage medium when an operation is repeatedly performed on the file, wherein the source storage medium comprises a storage medium type, wherein the operation uses a current management manner of the file comprising using a first file management granularity for the storage medium type;

determine an IO access mode corresponding to the IO access information when the operation is repeatedly performed;

match the IO access mode with a preset access mode in a mode matching library to obtain a file management policy associated with the IO access mode, wherein the file management policy comprises one of a second file management granularity, a file storage medium type, or the second file management granularity and the file storage medium type, wherein the mode matching library comprises a correspondence between the IO access mode and the file management policy; and adjust the current management manner to a new management manner when the current management manner is inconsistent with the file management policy, comprising:

apply, to a target storage medium, for a storage block used to store the file, wherein the target storage medium is a storage medium that is consistent with the file storage medium type comprised in the file management policy;

migrate the file from the source storage medium to the storage block, wherein the file is migrated and is operated according to another IO access request for operating the file, wherein a first part of the file is not stored in the source storage medium and a second part of the file is stored in the source storage medium, wherein the first part of the file in the target storage medium is operated after the file is migrated and the second part of the file is operated in the source storage medium according to the file storage medium type in the file management policy corresponding to the IO access mode; and create new metadata such that the new metadata comprises storage information of the file, wherein the new management manner uses the second file management granularity and the file storage medium type corresponding to the IO access mode.

7. The computer program product of claim 6, wherein the instructions when executed on the processor further cause the processor to:

determine that the IO access mode is a read operation mode when a read operation proportion of the file in the IO access information is greater than a preset value;

determine that the IO access mode is a write operation mode when a write operation proportion of the file in the IO access information is greater than a second preset value; and determine that the IO access mode is a read/write hybrid operation mode when a difference between the write operation proportion and the read operation proportion that are of the file and in the IO access information is less than a third preset value.

8. The computer program product of claim 6, wherein the instructions when executed on the processor further cause the processor to, when the first file management granularity is inconsistent with the second file management granularity in the current management manner of the file, update a management granularity of the file with the second file management granularity and update metadata of the file to comprise information about the second file management granularity.

9. A file system, comprising:
a processor;
a memory comprising instructions; and
multiple storage media that are separately connected to a bus, wherein the processor is coupled to the memory and configured to execute the instructions, the instructions causing the processor to be configured to:

acquire input/output (IO) access information for a file in a source storage medium of the multiple storage media when an operation is repeatedly performed on the file, wherein the source storage medium comprises a storage medium type, wherein the operation uses a current management manner of the file comprising using a first file management granularity for the storage medium type;

determine an IO access mode corresponding to the acquired IO access information when the operation is repeatedly performed;

match the IO access mode with a preset access mode in a mode matching library to obtain a file management policy associated with the IO access mode, wherein the file management policy comprises one of a second file management granularity, a file storage medium type of the multiple storage media, or the second file management granularity and the file storage medium type, wherein the mode matching library comprises a correspondence between the IO access mode and the file management policy; and adjust the current management manner to a new management manner that is consistent with the file management policy when the current management manner is inconsistent with the file management policy, comprising:

apply, to a target storage medium in the multiple storage media, for a storage block used to store the file, wherein the target storage medium is a storage medium that is consistent with the file storage medium type comprised in the file management policy;

migrate the file from the source storage medium in the multiple storage media to the storage block, wherein the file is migrated and is operated according to another IO access request for operating the file, wherein a first part of the file is not stored in the source storage medium, wherein a second part of the file is stored in the source storage medium, wherein the first part of the file is operated in the target storage medium after the file is migrated and the second part of the file is operated in the source storage medium according to the file storage medium type in the file management policy corresponding to the IO access mode; and create new metadata such that the new metadata comprises storage information of the file migrated, wherein the new management manner uses the second file management granularity and the file storage medium type corresponding to the IO access mode.

10. The file system of claim 9, wherein the instructions further cause the processor to be configured to determine that the IO access mode is a read operation mode when a read operation proportion of the file in the IO access information is greater than a preset value.

11. The file system of claim 9, wherein the instructions further cause the processor to be configured to determine that the IO access mode is a write operation mode when a write operation proportion of the file in the IO access information is greater than a preset value.

12. The file system of claim 9, wherein the instructions further cause the processor to be configured to determine that the IO access mode is a read/write hybrid operation mode when a difference between a write operation proportion and a read operation proportion that are of the file and in the IO access information is less than a preset value.

13. The file system of claim 9, wherein the instructions further cause the processor to be configured to, when the first file management granularity is inconsistent with the second file management granularity in the current management manner of the file stored in the memory, update a management granularity of the file in the memory with the second file management granularity and update metadata of the file to comprise information about the second file management granularity.

* * * * *